US009547832B2

(12) United States Patent
Gordon

(10) Patent No.: US 9,547,832 B2
(45) Date of Patent: Jan. 17, 2017

(54) IDENTIFYING INDIVIDUAL INTENTIONS AND DETERMINING RESPONSES TO INDIVIDUAL INTENTIONS

(75) Inventor: Merlyn Gordon, Livingston, MT (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 338 days.

(21) Appl. No.: 13/347,297

(22) Filed: Jan. 10, 2012

(65) Prior Publication Data
US 2013/0179440 A1    Jul. 11, 2013

(51) Int. Cl.
G06F 17/30    (2006.01)
G06Q 10/06    (2012.01)
G06Q 30/02    (2012.01)

(52) U.S. Cl.
CPC .............. G06Q 10/06 (2013.01); G06Q 30/02 (2013.01)

(58) Field of Classification Search
USPC .......................................... 707/731, 705.802
See application file for complete search history.

(56) References Cited

U.S. PATENT DOCUMENTS

| | | | |
|---|---|---|---|
| 7,289,949 B2 * | 10/2007 | Warner et al. ........ | G06F 17/271 704/9 |
| 7,801,956 B1 * | 9/2010 | Cumberbatch et al. ...... | 709/204 |
| 2003/0191627 A1 * | 10/2003 | Au ...................... | G06F 17/2785 704/9 |
| 2008/0242280 A1 * | 10/2008 | Shapiro et al. .. | H04N 21/25891 455/414.3 |
| 2008/0269958 A1 * | 10/2008 | Filev et al. ........... | B60W 50/10 701/1 |
| 2008/0270120 A1 * | 10/2008 | Pestian et al. ...... | G06F 17/2785 704/9 |
| 2009/0228583 A1 * | 9/2009 | Pocklington et al. .. | H04L 12/58 709/224 |
| 2010/0004980 A1 * | 1/2010 | Bowen ................... | G06Q 30/02 705/7.31 |
| 2010/0268725 A1 * | 10/2010 | Wang et al. ................... | 707/765 |
| 2010/0332373 A1 * | 12/2010 | Crabtree et al. ................ | 705/37 |
| 2011/0098029 A1 * | 4/2011 | Rhoads et al. ..... | G01C 21/3629 455/418 |

(Continued)

OTHER PUBLICATIONS

Owyang, J., "When Real Time is *Not* Fast Enough: The Intention Web," Dec. 4. 2009, 4 pgs. Retrieved from: http://www.web-strategist.com/blog/2009/12/04/when-real-time-is-not-fast-enough-the-intent-based-web.

(Continued)

Primary Examiner — Shyue Jiunn Hwa
(74) Attorney, Agent, or Firm — Kilpatrick Townsend & Stockton LLP

(57) ABSTRACT

Systems and methods automatically determine responses to intention-focused content based on semantic analysis, natural language analysis, token analysis, social network analysis and influence ratings. The systems and methods identify relevant queries for product support, purchase or advocacy from multiple communications channels and further separate the high-value conversations and individuals from the low value conversations and individuals in an efficient manner. Described herein is a system and method to use the identification of important individuals and the context of their conversations to appropriately route content items and messages and subsequent responses in such a way as to allow an efficient interaction to occur.

28 Claims, 6 Drawing Sheets

(56) References Cited

U.S. PATENT DOCUMENTS

| | | | |
|---|---|---|---|
| 2011/0246378 A1* | 10/2011 | Prussack et al. | 705/310 |
| 2011/0307490 A1* | 12/2011 | Chow | 707/741 |
| 2012/0290950 A1* | 11/2012 | Rapaport et al. | 715/753 |
| 2013/0006952 A1* | 1/2013 | Wong et al. | 707/706 |
| 2013/0031458 A1* | 1/2013 | Java et al. | 715/234 |
| 2013/0138424 A1* | 5/2013 | Koenig et al. | G06F 17/271 704/9 |

OTHER PUBLICATIONS

Solis, B., "The Predictive Web," Jan. 11, 2010, 12 pgs. Retrieved from: http://www.briansolis.com/2010/01/the-predictive-web.

\* cited by examiner

IDENTIFYING INDIVIDUAL INTENTIONS AND DETERMINING RESPONSES TO INDIVIDUAL INTENTIONS

FIELD

This disclosure relates generally to systems and methods for intent analysis, more particularly, to automatically determining actions to intentions based on semantic analysis, token analysis and influence ratings.

BACKGROUND

The proliferation of social interactions on the internet has introduced numerous opportunities to offer insights into people's interests and activities. A recent set of social applications or features has provided the next step beyond status updates, product or interest ratings and social sharing networks; the ability to describe future intentions of behaviors or activities offers a unique view into the explicit statements someone makes that can then be leveraged by others into offering support to that stated intention.

A technology analyst in the social media space, Jeremiah Owyang, has produced a taxonomy that describes where this intention space lies available at the URL (Uniform Resource Locator) www.web-strategist.com/blog/2009/12/04/when-real-time-is-not-fast-enough-the-intent-based-web/. Owyang lists the "Intention Web" as "Information that provides explicit predictions of who will do what next, although it's not happened yet." Examples include Upcoming.org, Facebook events, Plancast. Further examples include Tweetmeme, Topsy, Sency, and OneRiot. Owyang further explains the opportunities in this area as:

People can connect to each other, improving experience. Businesses can provide a more contextualized experience for customers or prospects using Social CRM Owyang recognizes the complexity of the problem he describes by stating the challenges:

Explicit intentions may not be true, the future is always uncertain. Companies can barely keep up with real time web—let alone predict the future.

Brian Solis takes Jeremiah's concept and extends it, providing a description at the URL: www.briansolis.com/2010/01/the-predictive-web which states:

Suddenly the predictive Web comes into focus. The innovation that materializes into products and platforms creates an ecosystem that wires the individual human algorithm to the technology that will work on our behalf to mine and present data, content, products, people and companies that match what interests us based on who we are—not solely derived from what we have in common. Just because we viewed a common item, purchased a product or service based on our click patterns or share contacts within networks, doesn't imply, nor does it guarantee, that we share interests, ideas, and ambitions. Therefore, the ability to predict is only as accurate as the technology that focuses on who we are defined by all we do.

Importantly, neither Owang nor Solis offer suggestions for how to make use of the intention data provided in this social medium, nor do they suggest how to interpret the quality of the intent while they specifically caution about the potential problems of intent quality.

BRIEF DESCRIPTION OF THE DRAWINGS

For a better understanding of the present invention, reference may be made to the accompanying drawings in which.

DETAILED DESCRIPTION

Figure 1:
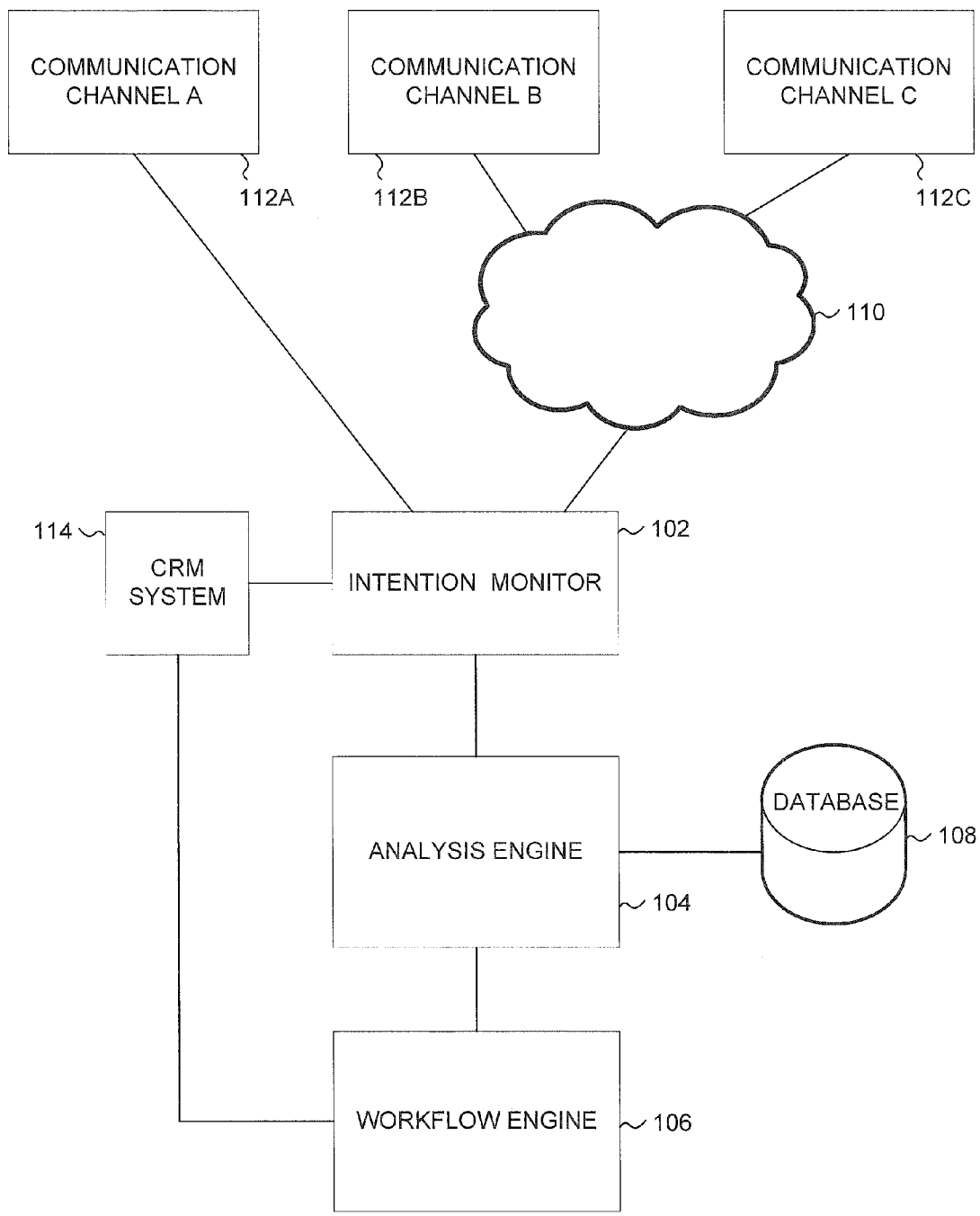
FIG. 1 is a block diagram of a system according to embodiments of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. Also, please note that the first digit(s) of the reference number for a given item or part of the invention should correspond to the Figure number in which the item or part is first identified.

The description of the various embodiments is to be construed as exemplary only and does not describe every possible instance of the inventive subject matter. Numerous alternatives can be implemented, using combinations of current or future technologies, which would still fall within the scope of the claims. The following detailed description is, therefore, not to be taken in a limiting sense, and the scope of the inventive subject matter is defined only by the appended claims.

For illustrative purposes, various embodiments may be discussed below with reference to a company customer support department that accepts multiple textual channels as a means of customer communication. This is only one example of a suitable environment and is not intended to suggest any limitation as to the scope of use or functionality of the invention. Neither should it be interpreted as having any dependency or requirement relating to any one or a combination of components illustrated in the exemplary operating environment.

In general, various embodiments combine, in a cross-channel environment, token recognition, semantic analysis with influencer identification and workflow and optionally with proprietary data about the originator of the content. This system aids in prioritizing how to respond to content, and to filter important information from a larger body of unimportant information.

In the specifics of discussing intent and its usage in a workflow environment, several definitions will be used in the specification. First, "intent" is any statement that is made, either verbally (or through verbal equivalents, such as sign language, etc.), via unstructured text communication or via structured interactions (such as filling out a form or a survey) that suggests future actions. These actions are for a workflow system when they refer to an event. In this context, "event" can be taken to mean any of (but not limited to) the following: attending a formal event, such as a conference, seminar, training class, promotional event, or user group; attending an informal event, such as a meeting with coworkers, acquaintances, friends or strangers, or even a solitary event, any of which may include, e.g., movie, meal, vacation and the like; the purchase of a product or service; or simply expressing an interest in a product, service or activity. More specifically specifying intent for such events may include (but is not limited to): indicating dates and/or locations, including recurring dates, date ranges and/or itinerant locations (starting at one place and moving to another place), indeterminate dates and indeterminate locations; purchasing via a store (specific or general), online, via a phone, or in person; or expressing a "fan" status, likes/dislikes, or other measures of favorable or unfavorable focus.

Any workflow system is composed of conditions and actions. In the case of acting on statements of intent, the relevant conditions include (but are not limited to) (1) identifying interest in the item by quantifying the magnitude and accuracy of the interest, (2) identifying the influence of the individual making the statement of intent, and (3) identifying the status (such as customer value, depth of relationship, or any number of other attributes) of the individual making the statement of intent.

The actions available include, but are not limited to: (1) marketing activities such as sending advertising (such as for hotel or flight arrangements, products that may enhance the experience of the event, etc.), such advertising may include promotions (discounts or other incentives for purchase); or custom event activities such as a corporate presenter altering a conference booth or the type of collateral or free handouts available based upon the types of individuals expressing an intent in attending, (2) sales activities such as acquiring competitive information (such as the individual attending a competitor event, the individual acquiring additional information or content about an item of interest, etc.) which can inform on any pending lead or deal quality; deal timing (whether to close the deal before, during or after the event); inform the customer value (such as their level of interest, their market segment or the like); or any cross sell or up sell opportunities, and (3) support activities such as prioritizing work on any open incidents before, during or after the event, arrangement of one-on-one sessions during the event and the like.

Each of the available actions may be provided via the original channel, in an individual's specified preferred channel, in a message appropriate channel, or simply escalated in the system for data record updates or for personnel activities.

The above stated conditions are supported by numerous functional methods. The interest condition includes, but is not limited to, the following approaches: interpretation of natural language in the statement to determine committing language ("will attend" vs. "may attend") or conflicting statements; sentiment of the statement (positive or negative statements of varying magnitude); the social commitment inherent in the statement (the visibility of the announcement—more public statements are more likely to be acted upon); the magnitude of the commitment (personal costs involved in making the statement—monetary, emotional or social); the social impact of the statement (size of social network impacted by the statement, etc.); or any actual payments made (via parsing the language of the statement for payment information or via integrations with back-end payment systems).

The influence condition includes, but is not limited to, the following approaches: social influence such as, but not limited to, the social network size or the number of influencers within the social network; product influence such as, but not limited to, prior volume of posts on the product, number of similar products purchased, length of product ownership/usage, or specific targeted influence such as via lists of industry analysts, potential customers and the like.

The status condition includes, but is not limited to, the following approaches: customer value such as profitability, number or type of products purchased and the like; existing memberships which may inform customer value, such as unlimited use, metered use, single use, etc.; any prior engagements of interest with the specified event or company, such as event attendance, products purchased, etc.; any current sales or support engagements and the status of said engagements; customer or lead quality metrics, such as, but not limited to, Customer Satisfaction score (CSAT) and the like.

FIG. 1 is a block diagram of a system 100 according to embodiments of the invention. In some embodiments, system 100 includes an intention monitor 102, an analysis engine 104 and a workflow engine 106. Intention monitor 102 receives content items from various communication channels 112 and selects various communications items for further processing. The selection of communications items may be based on various parameters, including search terms and/or the presence of various tokens in a content item.

A communications channel 112 can be any system that can post or deliver a content item. Thus communications channels may include web sites, social networking services, audio channels (over networks of phone lines), video channels etc. Examples of such communication channels and their corresponding content item are listed below in Table 1.

TABLE 1

| Communications Channel | Content Item |
| --- | --- |
| Email system | Email message |
| Twitter | Tweet |
| Facebook | Posting, chat, comments |
| Blog | Posting |
| Web Site | Web page, posting |
| RSS (Really Simple Syndication) | RSS Feed |
| Phone | Audio (recorded for analysis) |
| API | Open or closed integration |

Table 1 is not meant to provide an exclusive listing of communication channels and content items, those of skill in the art will appreciate that other forms exist and may be developed in the future. Further, various embodiments of the invention may utilize different combinations of communication channels and content items. The various communication channels 112 have different limitations and characteristics. For example, a phone channel is limited to auditory information and is primarily (in the absence of conference calling) limited to one-on-one conversations, whereas email is limited to textual and/or graphical information and is primarily (in the absence of distribution lists) limited to one-on-one conversations, whereas microblogging sites such as Twitter are limited to 140 characters of textual information but are distributed via broadcast to anyone. Clearly innumerate alternate variations exist, but it is notable that various communication channels can be auditory, visual or textual (alone or in combination) and be directed towards one-on-one communication, small group communication or broadcast communication.

Communication channels may be directly connected (e.g., a phone line) or they may be connected via a broadcast medium such as a network 110 (wired or wireless). Network 110 may be a collection of networks such as the Internet.

Some embodiments of the invention include an analysis engine 104 that receives selected content items from intention monitor 102 and applies various heuristics to content items in order to calculate various parameters regarding the content item. Such parameters may include a sentiment value for a content item, a natural language analysis of committing language in the content item, an influencer rating for the content item, and in some embodiments, a business value associated with the content item.

In some embodiments, analysis engine 104 may access a database 108 to obtain data useful in calculating the parameters described above. Such data may include proprietary data that a business has accumulated about customers, users or other entities. In some embodiments, such proprietary data may include any of the following, alone or in combination: number of support incidents, status of support incidents, disposition of support incidents, rate of support incidents, contact information across various channels such as email, social networks and phone, lifetime customer value, page views on a corporate system, clickthrough rates on marketing campaigns, sharing rates of marketing campaigns, most recent purchase amount, purchase history dates, active purchase negotiations, marketing opt-in values, net promoter score, responses to survey questions, likelihood to buy indicators, demographic information, current service level agreements, and warranty status. One of ordinary skill in the art having the benefit of the disclosure will appreciate that additional proprietary data may be available and useful, and that no limitation is implied or inferred by the herein described list.

Workflow engine 106 receives parameters related to content items and determines an action with respect to the content item based on the parameters. In general, workflow engines are known in the art, and typically include the ability to handle service level agreements (SLAs) to prioritize and route customers of varying levels to the appropriate work queues, skills based routing (SBR) to allow items to route to individuals with the appropriate skills to handle that item, automated search functionality that attempts to automatically match the item with reusable content, escalation ability to move items from one queue or assignment into another if specific business conditions are met, and many other standard business practices. Some of these techniques are very simple rules such as IF customer='John Doe' THEN assign_item=PRIORITY_QUEUE, while others may be very complex, such as IF item MATCHES_BY_NATURAL_LANGUAGE_ANALYSIS_product_A THEN assign_item=PRODUCT_A_QUEUE. Natural language analysis can include any number of very complex operations. Other complexities include automatic identification of content for matching skill sets (SBR) and the like. Finally, workflow engines in the art typically provide the ability to combine multiple conditions and actions into a single rule. Other functionalities may be provided in standard workflow engines. Some embodiments provide functionality and/or modifications that are not found in workflow engines known in the art. For example, in some embodiments, workflow engine 106 provides coupling with the large variety of communications channels as well as any specific information provided by a sentiment and/or influencer analysis. Such coupling includes the ability (either automatically or by setting the default channel for a human response) to respond in the source communications channel or via an alternate communications channel as defined by the rules constructed in the system, to update any analysis engine calculations that the workflow has determined may be inaccurate, to restrict the length of response or add additional requirements or data fields based on meta-data about the response channel and additional similar modifications that are not part of workflow engines known in the art. This list of functionality and modifications above is not exhaustive and one of ordinary skill in the art having the benefit of the disclosure can identify additional conditions and actions that apply when monitoring and analyzing content from numerous external sources.

Some embodiments of the invention may contain a Customer Relationship Management (CRM) system 114. CRM system 114 may be used for various purposes. In some embodiments, CRM system may supply intention monitor 102 with terms such as company names, product names, service names etc. that may be obtained from a catalog maintained by the CRM. In addition, CRM may receive updates, queue entries, task requests etc. as a result of actions performed by the workflow engine 106.

Figure 2A:
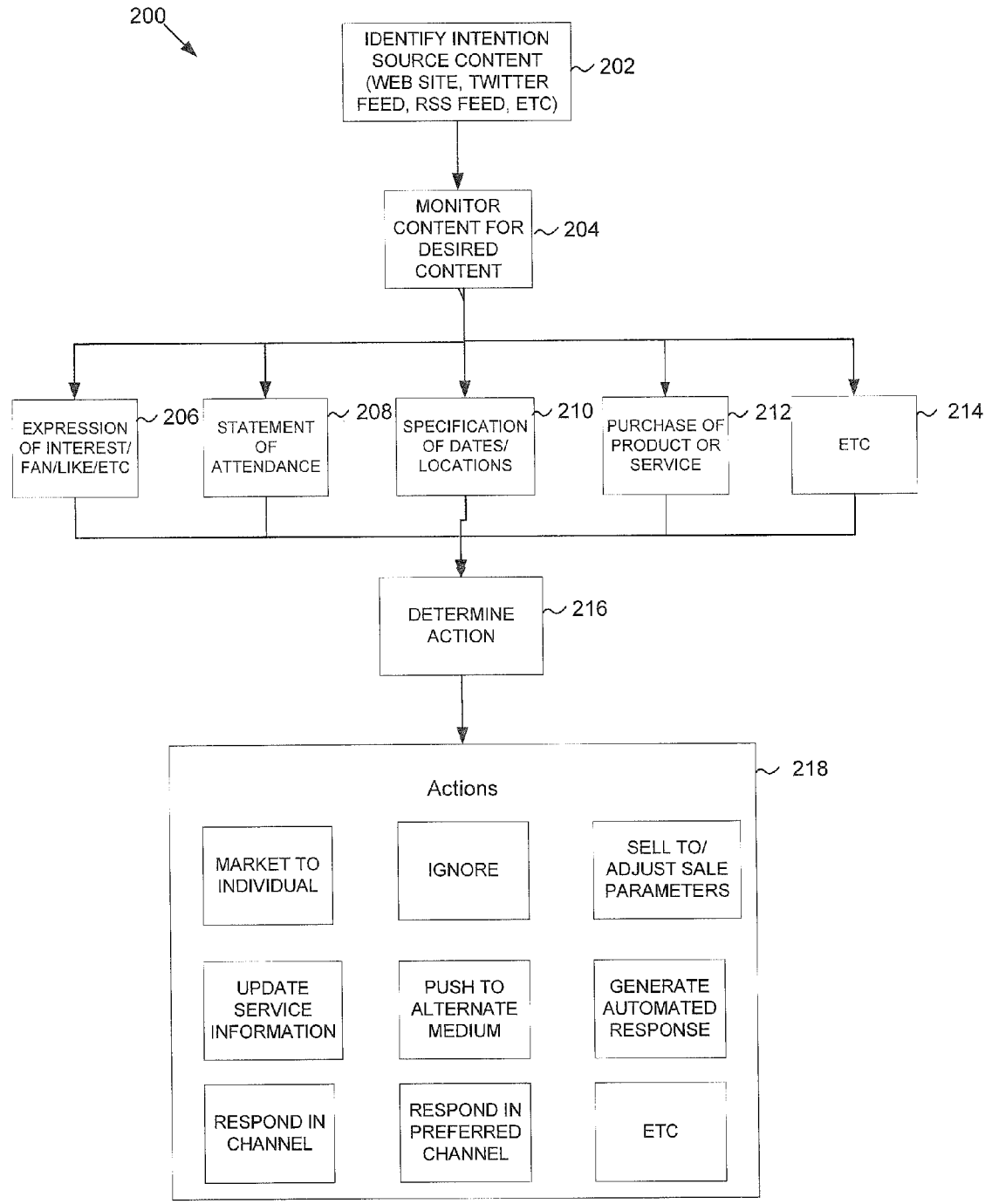
FIGS. 2A-2C are flowcharts illustrating methods for performing actions in accordance with content analysis according to embodiments of the invention.
Figure 2B:
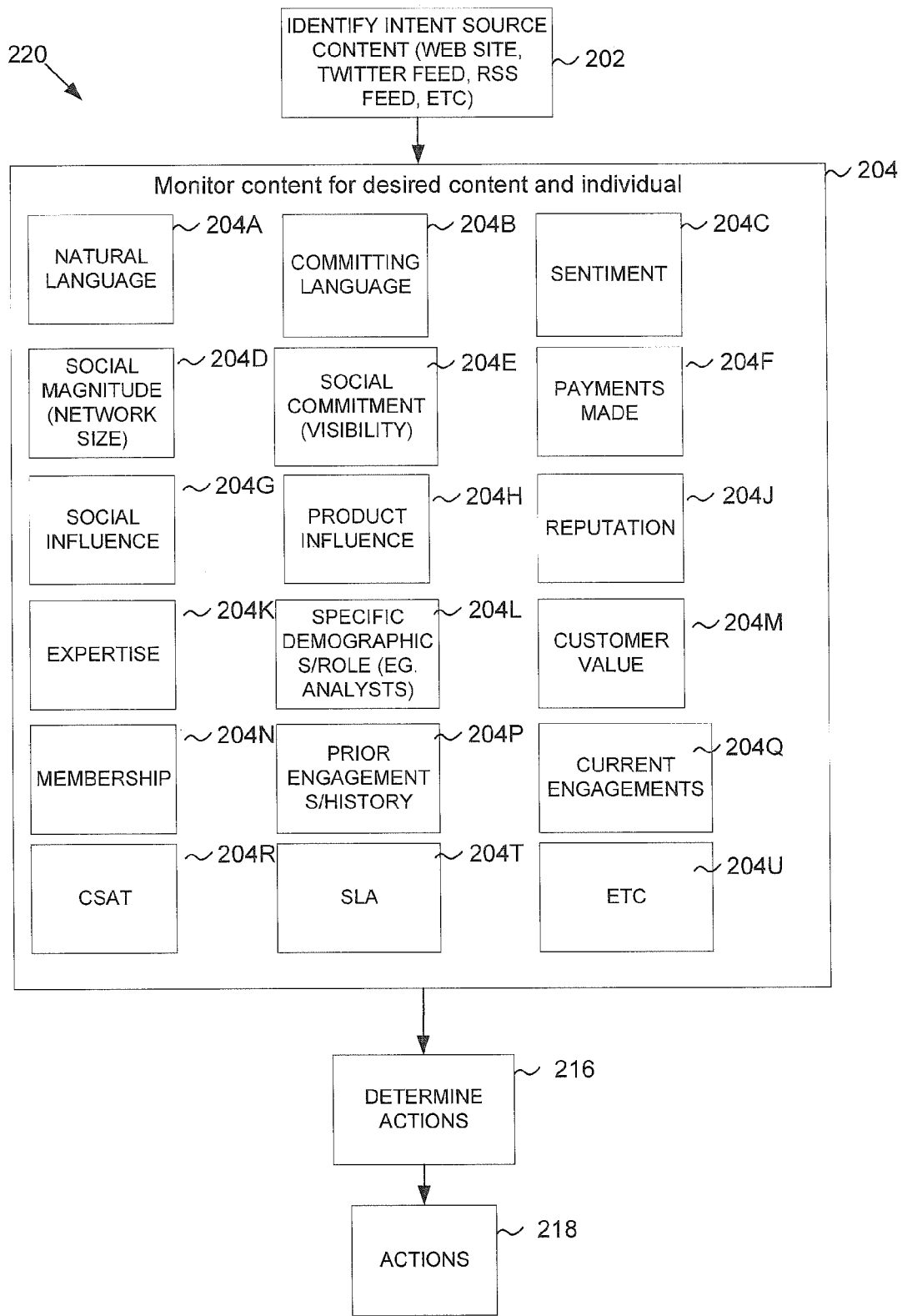
Figure 2C:
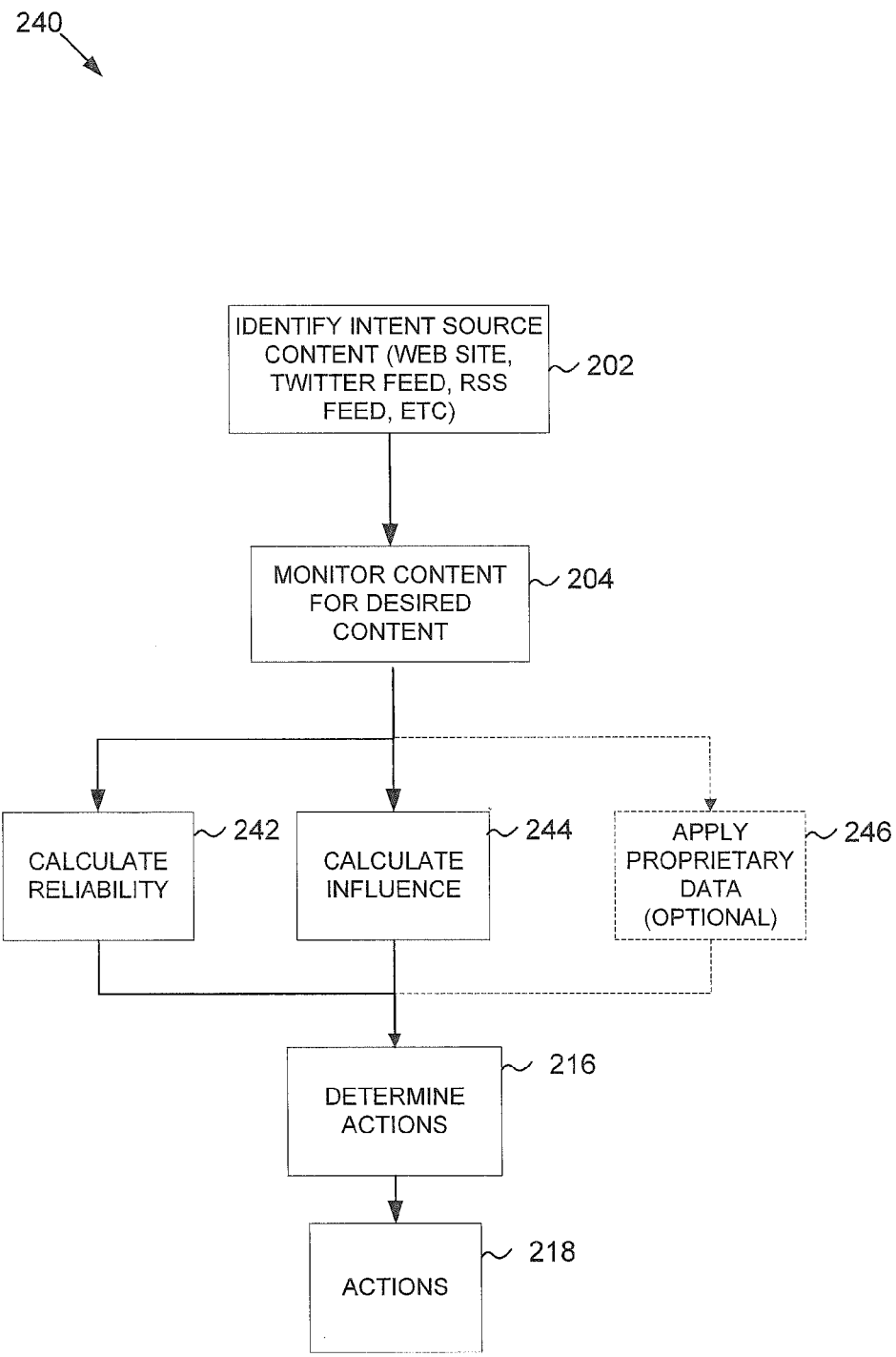

Further details on the operation of the above described components are described below with respect to FIGS. 2A-2C. FIGS. 2A-2C are flowcharts describing methods according to various embodiments. The methods may, in some embodiments, constitute computer programs made up of computer-executable instructions. Describing the methods by reference to a flowchart enables one skilled in the art to develop such programs including such instructions to carry out the method on suitable processors (the processor or processors of the computer executing the instructions from machine-readable media). The methods illustrated in FIGS.

2A-2C are inclusive of acts that may be taken by an operating environment 100 executing an exemplary embodiment of the invention.

FIG. 2A is a flowchart illustrating a method 200 for determining actions based on content analysis according to embodiments of the invention. Method 200 begins at block 202 with identifying a source communication channel for content items. Once identified, the system may connect to the desired source to receive content items from the communication channel. Similarly, actions included at block 202 may also include identifying additional relevant context about the content, such as weather forecasts, news reports, location based services, and the like.

At block 204, the method monitors content items received from a communication channel to determine if the content item is of interest (i.e., to determine if the content item is to be further processed). In some embodiments, determining if a content item is of interest may involve searching the content item for the presence of search terms or tokens, or using other techniques that may be provided by the communication channel (e.g., subscription to a particular topic etc.). In addition, determining relevance may include correlation with additional relevant context, such as weather forecasts, news reports, location based services, and the like.

If the content is selected for further processing, the method proceeds to execute a selection of blocks 206, 208, 210, 212 and 214.

At block 206, if executed, the system performs an analysis of the interest the user expresses in the content item. In general, the analysis may include natural language comparisons to determine if the language used in the content item includes positive sentiment words directed at the focus of the intention. Said language may include phrases such as "I like", "This product is great" and the like. In some embodiments these expressions of interest may also be expressed in fixed formats, such as clicking a button or selecting a link or other similar action for "like" or "become a fan" or "+1". In some embodiments, semantic analysis is applied to the content item. The term semantic analysis includes determining the emotional content of textual information. Semantic analysis may also include determining general descriptions of value, quality, likelihood to buy indicators, support questions vs. opinion positions, and the like, and are included in this definition. Similarly, semantic analysis may be performed on non-textual data such as voice, music or even images and video and no limitation is implied or inferred to relate only to textual content. Further details on the application of semantic analysis that may be used in various embodiments of the invention may be found in U.S. Pat. No. 7,289,949 co-authored by one of the current inventors, which is hereby included in its entirety by reference herein for all purposes.

At block 208, if executed, the system calculates an indication of attendance for the content item. Individuals are more likely committed to something if they state they are attending an event related to that thing. In some embodiments the indication of attendance calculation can analyze the words used in the content item to identify key phrases such as "I am attending" or "I can't wait to go" or the like. In other embodiments the indication of attendance may be extracted from fixed formats such as identifying from the content item an airline itinerary, an event registration form, an RSVP and the like.

In some embodiments, block 210 may be executed. At block 210, the system extracts from the content item specifications of dates and/or locations. Similar to block 208, this analysis can use either language analysis or fixed format content to determine whether a content item creator has specified dates and locations which would increase the likelihood of commitment calculations.

In some embodiments, block 212 may be executed. Similar to other blocks, language or fixed field analysis can be used to determine if the content creator specified or otherwise indicated that a product or service was purchased. Such an indication is a strong indicator of commitment.

In some embodiments other evaluations and calculations to determine commitment may also be undertaken, as noted by block 214. The list of blocks 206-212 is not intended to be complete and one of ordinary skill in the art having the benefit of the disclosure can identify additional evaluations or results that can be determined from a content item that may indicate commitment, such as, but not limited to, visibility of announcement/social commitment, size of event or purchase, influence level and/or status of the content poster within a focused or large group, historical consistency of followthrough, prior statements on the same topic, and any number of other similar measures. Any of these can be performed at block 214.

At block 216, an action is determined based on the computed level of commitment. For example, the outputs of blocks 206-214 may be used to determine if a response is warranted, and if so, which channel is the appropriate channel in which to respond (the originating channel or an alternate channel). In some embodiments, the actions 218 that may be performed include various combinations of one or more of the following:

Market an item to the content poster
Ignore the content
Sell to the content poster or adjust an existing set of sales parameters
Update service information in a CRM system
Push responses via an alternate system (such as order fulfillment or returns) or response channel (such as social media, phone, email, chat, etc.)
Generate an automated response
Respond in the same channel
Identify a preferred channel and respond in that channel Those of skill in the art having the benefit of the disclosure will appreciate that other actions may be performed and such actions are within the scope of the inventive subject matter.

In some embodiments, a communications channel for a response to a content item may be selected in accordance with various characteristics of the response. For example, while a content item may be received via Twitter (and thus limited to 140 characters of text) response content may utilize more than 140 characters of text, or may contain audio or graphics. In such cases, a communications channel for the response may be selected that is appropriate to the characteristics of the desired response. Additionally, a characteristic of the response may include whether the response is directed to the author of the content item (e.g., an email, phone call etc.) or whether the response is to be broadcast such that it is available to multiple parties (e.g., posting on a web page, RSS, Twitter etc.)

FIG. 2B is a flowchart illustrating a method 220 for determining actions based on content analysis according to embodiments of the invention. As with method 200 above, method 220 begins at block 202 with identifying a source communication channel for content items. Once identified, the system may connect to the desired source to receive content items from the communication channel.

At block 204, the method monitors content items received from a communication channel to determine if the content item is of interest (i.e., to determine if the content item is to be further processed). In some embodiments, determining if a content item is of interest may involve various combinations of one or more of the operations indicated at blocks 204A-204U.

At block 204A, the system analyzes the content item for generic trigger tokens. Examples of such trigger tokens include generic terms such as "help" "install" "configure" "problem" "trouble" and the like, in addition to those more specific examples expressed above in relation to the description of blocks 206-212.

At block 204B, the system analyzes the content item to determine if committing language is used in the content item. Committing language can include phrases such as "I expect", "I will", "I want", "I hope" and the like. One of ordinary skill in the art having the benefit of the disclosure can identify numerous other committing language indicators and certain linguistic and psychology research areas have investigated word choice in relation to commitment.

At block 204C, the system analyzes the sentiment of the content item as discussed in depth in the description of block 206.

At block 204D, the system analyzes the meta-information around the content item to determine the magnitude of the visibility of the content posting. This analysis may be available directly by querying the posting environment for the subscriber size (including, for example, the number of friends of the poster, the number of followers of the poster or the number of subscribers to the service, etc.). In some posting environments this number may not be directly accessible and may require doing network analysis, probing, or various other techniques known to one of ordinary skill in the art.

At block 204E, the system analyzes the social commitment, or visibility of the content posting. This is similar to the calculation at block 204D, but includes recognition about whether the full network calculated at 204D had visibility to the content item or whether only a sub-group of that network had visibility to the content item.

At block 204F, the system analyzes whether the content poster made any payments supporting the statement included in the content. This analysis may come through direct analysis of the content, e.g. the content containing the phrase, "I paid $19.95 for this thing"; the access to structured information about the content, e.g. identifying programmatic identification of a receipt attached to the content either textually, as an image, or through other graphical or auditory or structured data approach; or by connecting to a third-party database using the content creator's identifying characteristics, such as a CRM or eCommerce system connected either directly with the system (e.g. block 114) or via business agreements or open protocols.

At block 204G, the system calculates an influence rating for the content item. In the some embodiments, an influence rating is associated with an identified influencer, e.g., the individual that was the source of the content. The influence rating captures relevant aspects of the individual behind the content, and may comprise any of the following alone or in weighted combination: number of posts in the current channel, % of relevant posts vs. total posts, number of followers, size of network (number of followers+number following), size of network (number of followers vs. number following), number of views of posts, quality of followers, length of post, linguistics of post (adverbs, strong tone, etc.), multi-lingual nature of post, geographical distribution of followers, completeness of poster description (avatar, biography, etc.), frequency of posts, frequency of relevant posts, identified or verified in other channels, rate of contribution on other channels, relative ranking in the system, click through rates on relevant ads, click through rates on marketing communications, community reputation. One of ordinary skill in the art having the benefit of the disclosure will appreciate that additional components that may define all or part of an influence rating calculation and no limitation is implied or to be inferred by the herein described list.

At block 204H, the system analyzes the poster's product influence. Similar to the social influence, product influence is focused only on communications relating to a specific product or product line or other similar focus. Said calculation can be performed similar to social influence calculations, but then include a filter relevant to communications relevant to a specific product, service, or the like. Similarly, additional external information may be used to support this calculation, for example whether the poster is an analyst in this area, whether he or she is a moderator on a social network on said product or service, etc. Said external information can be collected from the social network directly (e.g. via profile information), via $3^{rd}$ party network information, or via connections to known contact information, e.g. the CRM system of block 114.

At block 204J, the system analyzes the poster's reputation. Reputation can be calculated a number of ways, all equally useful. Reputation can be calculated by the social network site and collected from there. Alternately, reputation can be collected from $3^{rd}$ party sites built to calculate reputation, or can be based upon information collected against known contact information, e.g. the CRM system of block 114.

At block 204K, the system analyzes the poster's expertise. This can be done using natural language analysis, historical information (on the current social network site or across multiple sites) or via known contact information, e.g. the CRM system of block 114.

At block 204L, the system identifies characteristics about the individual poster, such as demographic information of interest or personal criteria such as job or hobby activities that are of specific interest. Similar to block 204H this information can be extracted either from the communication channel (e.g. via profile information), via $3^{rd}$ party network information, or via connections to known contact information, e.g. the CRM system of block 114.

At block 204M, the system incorporates customer value measures. Customer value is a measure of the individual's importance to a company, usually by calculating how much money the individual has spent with the company. The customer value measure can vary in innumerable ways to include weighting for recent purchases, inclusion in promotional activities (recommendation programs and the like), or any number of variations that are known in the art or to one of ordinary skill in the art.

At block 204N, the system incorporates an analysis of any membership attributes of the contributor. When companies differentiate between general public and priority programs (such as gold, silver, bronze and the like), either paid membership or automated entitlements, said membership information can influence the value placed on the content.

At block 204P, the system analyzes any prior engagements or history of posts from the individual. This analysis can weigh the likelihood of the contributor to follow through on statements, whether or not the contributor is posting from a position of knowledge (e.g. whether or not the individual has purchased an item that the content addresses), whether or not the contributor has interacted with the company on support or trouble tickets, and whether or not said interaction was in relation to the content of the current posting.

At block 204Q, the system analyzes any current engagements (e.g. support or sales) and whether or not those engagements are relevant to the content of the posting.

At block 204R, the system incorporates customer satisfaction (CSAT) scores. CSAT scores are one measure of how engaged and happy a customer is with a product and/or company. In some embodiments, said information can be available via the CRM system of block 114.

At block 204T, similar to block 204N, the system analyzes whether the poster has any special access via a service level agreement (SLA). Commonly an SLA will dictate the quality, channel, and timing of any interactions between the customer and company. In some embodiments, the SLA can be available via the CRM system in block 114.

Block 204U represents analysis associated with other of a plethora of content monitoring features. For example, one of ordinary skill in the art having the benefit of the disclosure can identify numerous similar measures as described at blocks 204R and 204M to weigh the customer's importance and nature with respect to the company; this listing of 204A-T is not intended to be a complete listing of content items but rather is representative of some of the common attributes found useful for content monitoring.

The parameters determined by any of blocks 204A-U may then be used at block 216 to determine an action (for example, using a configurable workflow engine designed to handle such parameters and generate actions 218).

It should be noted that one or more of blocks 204A-U need not be executed by some embodiments. For example, in FIG. 2B, block 204B may be executed to determine desired content while blocks 204A and 204C-U need not be present or executed.

FIG. 2C is a flowchart illustrating a method 240 for determining actions based on content analysis according to embodiments of the invention. In general, method 240 combines elements of methods 200 and 220. Method 240, like methods 200 and 220 above, begins at block 202 with identifying a source communication channel for content items. Once identified, the system may connect to the desired source to receive content items from the communication channel.

Next, at block 204, including one or more of blocks 204A-U may be executed to determine if a content item from a source communication channel is of interest. The functionality provided by blocks 204A-U has been described above.

Next, blocks 242, 244, and optionally block 246 may be executed to provide reliability, influence rating, and optionally proprietary data as described above with reference to FIG. 2A. The results of blocks 242, 244 and optionally, block 246 may then be used at block 216 to determine one or more actions 218 with respect to a content item. The functionality provided by blocks 242, 244 and 246 has been described above with reference to FIG. 2B.

At block 244, the system calculates an influence rating for the content item. The calculation of an influence rating has been described above with reference to blocks 204G and 204H (FIG. 2B).

In some embodiments, block 246 may be executed. At block 246, the system obtains proprietary data about the person or entity that was the source of the content item (e.g., an influencer). The proprietary data may be used in some embodiments to determine a contextual interpretation of the content item or author of the content or to determine a business value associated with the person or entity that was the source of the content item. Examples of the data that may be used in such a determination have been described above with reference to database 108.

Figure 3:
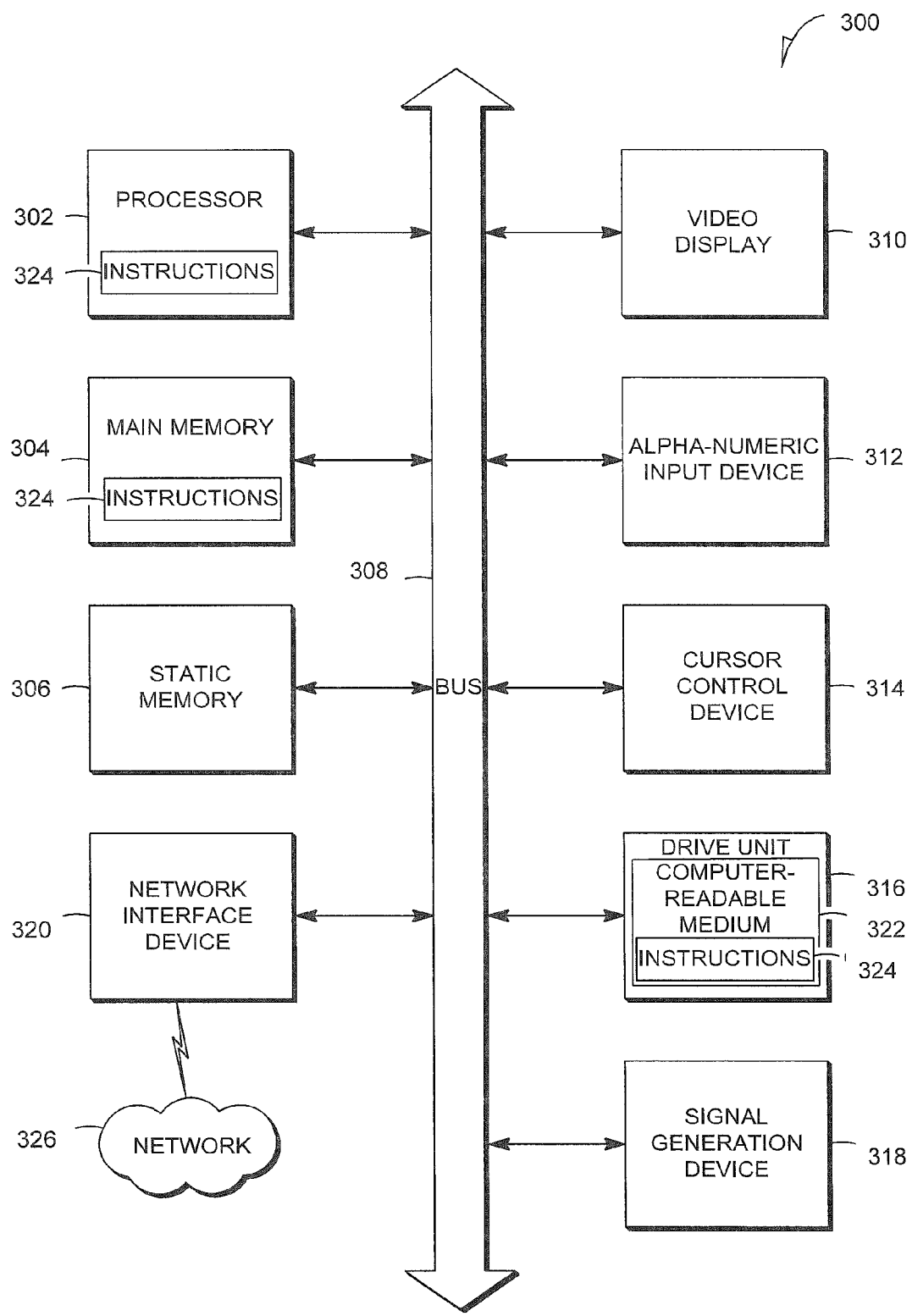
FIG. 3 is a block diagram of an example embodiment of a computer system upon which embodiments inventive subject matter can execute.

FIG. 3 is a block diagram of an example embodiment of a computer system 300 upon which embodiments inventive subject matter can execute. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 3 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 3, a hardware and operating environment is provided that is applicable to both servers and/or remote clients.

With reference to FIG. 3, an example embodiment extends to a machine in the example form of a computer system 300 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). In example embodiments, the computer system 300 also includes one or more of an alpha-numeric input device 312 (e.g., a keyboard), a user interface (UI) navigation device or cursor control device 314 (e.g., a mouse), a disk drive unit 316, a signal generation device 318 (e.g., a speaker), and a network interface device 320.

The disk drive unit 316 includes a machine-readable medium 322 on which is stored one or more sets of instructions 324 and data structures (e.g., software instructions) embodying or used by any one or more of the methodologies or functions described herein. The instructions 324 may also reside, completely or at least partially, within the main memory 304 or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media that can store information in a non-transitory manner, i.e., media that is able to store information for a period of time, however brief. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 324 may further be transmitted or received over a communications network 326 using a transmission medium via the network interface device 320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Figure 4:
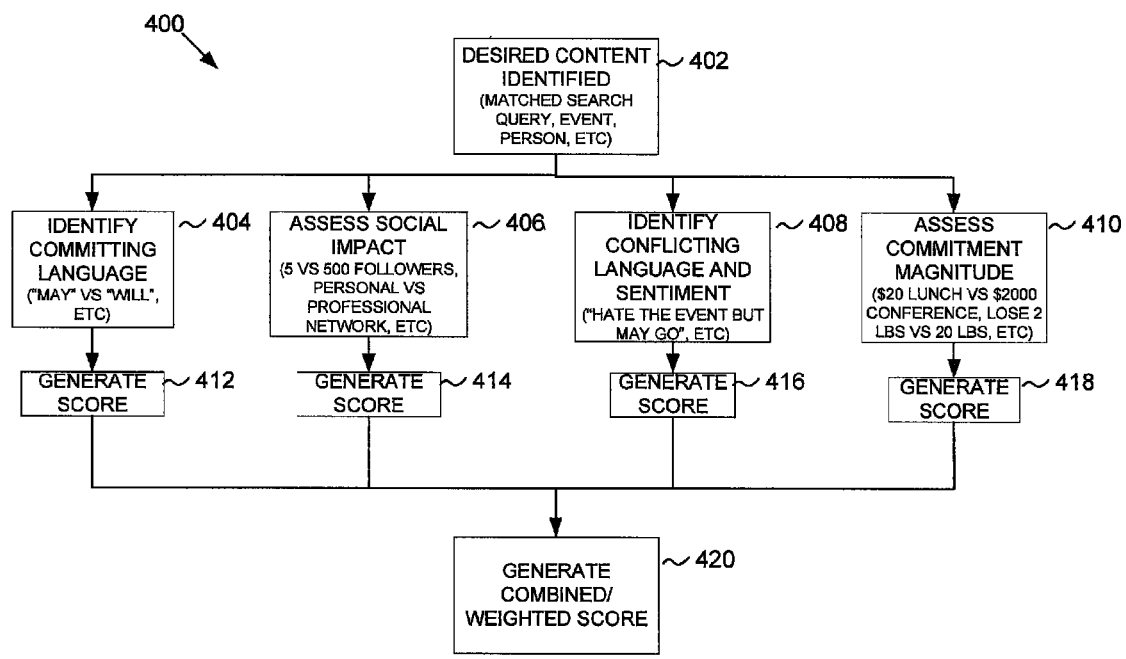
FIG. 4 is a block diagram of some example analyses performed in a system according to the embodiments of the invention.

FIG. 4 is a block diagram of an example 400 of calculating a combined score 420 from identified content 402. This combined score 420 is used to trigger the actions that are used and described in detail above. With reference to FIG. 4, an example embodiment of the sub-process within the full system disclosed herein is covered in greater detail.

At block 402, specific content is identified from content analysis. This block is analogous to the output of block 204 in FIG. 2A.

Blocks 404-418 are analogous to the group of blocks 206-214 in FIG. 2A.

Specifically, at block 404 the system identifies any committing language that exists in the content using a comparison of terms such as "may" and "will" where the term "will" is determined to offer a higher degree of commitment than "may". One of ordinary skill in the art having the benefit of the disclosure can identify numerous additional term choices which provide distinction of committedness in language.

At block 412 the system generates an overall score of committedness for the content after processing all committing language within the content.

At block 406 the system assesses the social impact of the poster. Example measures used include the relative number of followers, whether the network where the content was posted is a personal or a professional network, and other impact ratings as will be appreciated by one of ordinary skill in the art having the benefit of the disclosure.

At block 414 the system generates an overall score of social impact for the content and poster after processing all social impact attributes available.

At block 408 the system identifies conflicting language and sentiment. Example measures include recognizing negative sentiment items with positive outcomes or vice-versa.

At block 416 the system generates an overall score of conflict for the content and poster. For ratings such as said conflict rating, the resulting score may be, e.g. a negative score resulting in decreasing an overall score when excessive conflict is detected, but a positive score if no conflict is detected.

At block 410 the system assesses the commitment magnitude of the content and poster. Example analysis points include the cost of the item discussed, in this case a $20 lunch versus a $2000 conference fee or a commitment to lose 2 versus 20 pounds on a diet. Magnitude can address many distinct dimensions however, it is desirable that the magnitude indication contain some reference qualities for analysis to determine whether a specific value is a large or small magnitude for the specified item.

At block 418 the system generates an overall score of commitment magnitude for the content and poster. Small commitment magnitudes may have minimal impact on any overall calculations while large magnitudes may have a correspondingly large impact.

Finally, at block 420 the system combines the scores generated at steps 412-418 into a single score that can be used to determine the actions of the system, e.g. at corresponding block 216 in FIG. 2. Notably, as discussed in blocks 416 and 418, the generated score can include weights that are effectively non-influencing to the final result or may even change the direction of impact of the final result. In addition, each of the individual scores may have a bias weight applied, resulting in stronger influence from some blocks and lesser influence from others, depending upon the specific embodiment of the system.

The following examples are provided to illustrate the operation of the above described systems and methods.

Example 1

John wants to sell his vinyl LP music collection, and posts his intention to do so through the Twitter app on his iPad. His Twitter message looks something like this: "Finished inventorying my old jazz records. Now packing them into 5 huge boxes so I can sell them online soon."

ACME Shipping Corporation regularly monitors Twitter, and their system discovers a match in John's post with custom search terms they regularly track (e.g. "packing" and "boxes"). The system sends John's post to their Analysis Engine 104 where intent to ship is determined through an analysis of Committing Language ("so I can sell them online soon"), and Social Commitment (broadcast of intent via Twitter). The Engine also determines a high probability of action within the next week based upon an analysis of John's recent increased activity on social buying/selling sites monitored by the system, as well as a recent increase in John's shipping activity as recorded in the ACME CRM system (John has a premium ACME Shipping account).

The Analysis Engine 104 determines John's location from data passed to the Engine through his location-aware device (i.e. John's iPad is in Chicago), establishes that John intends to ship his boxes the week before Christmas (i.e. a historically high-volume week for shipping), and notes that there have been recent airport closures in John's area due to heavy blizzard conditions (the system monitors and parses current event news feeds).

This data is then forwarded to the workflow engine where the ACME business administrator has configured a rule which states, "IF post=positive_intent AND poster=high_probablity_of_action AND poster=in_CRM AND poster_value=premium THEN create_ticket AND set_contact_channel=twitter AND assign_ticket=priority_queue".

The system creates a ticket in the ACME CRM system with the content of the Twitter post, assigned to the priority queue with John's information attached. In addition, the ticket contains geo-location information from the post, a flag indicating John intends to ship during a peak shipping window, and a current event news report related to shipping in his area (i.e. recent airport closures and impacts to shipping).

When the support agent Sue, who monitors the priority queue from ACME's centralized contact center, reads the ticket, she identifies that the system has indicated to respond via Twitter, and to provide John with shipping rates and information related to packages originating out of the Chicago area. The ticket also indicates that the response should alert John to possible shipping delays if he ships next week.

The result is that Sue sends a public message to John on Twitter from the system, with the following message and URL: "Shipping some boxes from Chicago in the next week or so? We have rates & info about the blizzard on our site here http://bit.1y/acme222". The URL, automatically generated by the system, links to a webpage hosted by ACME which includes knowledge articles specifically related to 1) shipments originating from Chicago, 2) information about shipping during the busy Christmas season, 3) information about current delays related to weather affecting the Chicago region, and 4) upsell information for priority shipping during weather events and holiday seasons.

Example 2

Mary is a frequent international business traveler. As she readies for a trip from the U.S. to the U.K., she updates her Tripit status to include dates of travel, as well as details about her flight and lodging in London. While on her layover in Minneapolis, Mary checks-in using Foursquare and adds a comment to the check-in post stating, "Looks like I may have a day-trip to the Netherlands included in this trip. Definitely not prepared to power my laptop outside of the UK ☹".

British Hotels, part of the World Hotels franchise, is Mary's preferred lodging while in the UK. World Hotels automatically monitors the social profiles of its customers (social profiles are automatically matched and extracted from the CRM system), and their system automatically sends posts to the Analysis Engine 104 when travel-related keywords are discovered in social posts. Mary's update to Tripit, and her travel-related post on Foursquare were automatically routed to the Analysis Engine 104 by the system. The Analysis Engine 104 determines intent (committing language: "may have a day-trip"), sentiment (frowning emoticon: ☹), and probability of action (Per Mary's Tripit profile, she travels to the Netherlands almost as often as she travels to the UK).

The World Hotels business administrator has configured a rule which states, "IF post=positive_intent AND poster=high_probablity_of_action AND sentiment=negative AND poster=in_CRM AND poster_value=preferred AND region=UK THEN create_ticket AND assign_ticket=UK_priority_queue".

The system creates a ticket in the World Hotels CRM system with the content of the Tripit and Foursquare posts, assigned to the British Hotels priority queue with Mary's information attached. When Bob, the World Hotels support agent who monitors the British Hotels priority queue, reads the ticket, he identifies that Mary is in-transit to their London location and may be unprepared for business travel to the continent. Bob decides to create a ticket for the London hotel staff who will prepare for Mary's arrival. The ticket which is routed to the hotel's front desk includes Mary's check-in details, travel options for a day-trip to the Netherlands, and instructions to make available a power adapter designed to allow Mary to plug her laptop into outlets in the Netherlands.

Example 3

Felix is a student at USA College, and has "liked" their Facebook page when he first enrolled. In a recent post on his own Facebook page, Felix indicates that he plans to remain on campus during the upcoming summer break, the same course of action he pursued last summer while at school.

USA College is interested in filling their summer class schedule, which is often a challenge when the majority of students depart for summer break. USA College has found that an effective approach to filling summer courses is to encourage students to serve as Teaching Assistants in exchange for discounted summer credits.

USA College automatically monitors its own Facebook page, as well as pages of users who have become fans of the college (e.g. "Liked" the USA College Facebook page). Monitoring for custom search terms on Facebook, the USA College CRM system picks up Felix's Facebook post and sends it to the Analysis Engine 104. The Analysis Engine 104 determines intent ("plan to spend the summer on campus") and the probability of action (Felix's social posts indicate he has a track record of spending summers on campus).

The USA College business administrator has configured a rule which states, "IF post=positive_intent AND poster=high_probablity_of_action AND poster=existing_student AND semester=summer AND channel=Facebook THEN serve_Facebook_ad AND add_to_email_list=discount_summer_tuition".

The result is that Felix sees an advertisement from USA College on his Facebook page promoting the discounted summer tuition opportunity, and he is automatically added to a targeted email marketing list run through USA College's CRM system.

Example 4

Widgets & Cogs, Inc. is a business-to-business supplier of aluminum airplane parts. They maintain a list of leads and prospects in their CRM system, and monitor social business networking sites to discover new contacts, as well as develop existing opportunities.

Barbara is an executive whose email address is in the Widgets & Cogs prospect CRM database. Recently, Barbara posted a tweet indicating that she was planning to attend an upcoming tradeshow. As Barbara had linked her LinkedIn account to her Twitter feed, the post also made its way to the LinkedIn newsfeed.

Widgets & Cogs monitors Twitter using custom search terms through its CRM system. Recently, Widgets & Cogs has been monitoring social posts for interest in the upcoming trade show. Posts matching the defined search criteria are sent to the Analysis Engine 104. Barbara's post included the hashtag for the upcoming trade show she intends to attend, and therefore was sent to the Analysis Engine 104.

The Widgets & Cogs business administrator has configured a rule which states, "IF post=positive_intent AND poster=prospect_in_CRM THEN update_contact_record AND notify=business_development" AND newsletter_subscribe=yes.

The result is that Barbara's contact record, which previously did not contain her Twitter or LinkedIn username, was updated, and the Business Development Representative assigned to Barbara was notified of her intent to attend the upcoming trade show. In addition, Barbara was added to the newsletter for the tradeshow attendees.

Example 5

Lawrence recently downloaded a productivity app from ACME Notes in the Android Marketplace, and after a few days, was presented with a notification on his device asking if he would like to rate his experience and satisfaction with the newly purchased app. Lawrence, who is not having a good experience with the app, accepts the offer and submits feedback regarding the buggy nature of the software through the Android Marketplace. After completing the feedback survey, Lawrence writes a review of his experience on his Tumblr blog, and mentions that after his recent poor experience, he may not download ACME Notes' new release scheduled for availability in a few months. Through a linkage between his blog, Twitter, and various other social media outlets, Lawrence's review begins to make its way across several social networks.

ACME Notes, the developer of Lawrence's app and other productivity tools, regularly monitors social networks, and their system discovers a match in Lawrence's blog post with custom search terms they regularly track (e.g. ACME Notes branded keywords). The system sends Lawrence's multiple social posts to their Analysis Engine 104 where intent to purchase (or not purchase) is determined through an analysis of Committing Language ("I may not download the new release"), as well as Social Commitment (broadcast of intent across multiple social networks). In addition, the Analysis Engine 104 determines potential to influence based upon his Klout Score (i.e. reach, amplification, network impact (see e.g., URL klout.com/corp/kscore), and establishes that Lawrence's opinions carry significant weight across his expansive social graph. The Engine also determines a high probability of action (or inaction) within the next few weeks based upon an analysis of Lawrence's social post, and his recently completed feedback survey captured in the CRM system. Finally, through an analysis of unstructured text contained within Lawrence's Tumblr blog post, negative sentiment is established.

The ACME Notes business administrator has configured a rule which states, "IF post=negative_intent AND poster=high_probablity_of_followthrough AND sentiment=negative AND poster=in_CRM AND poster_value=influencer THEN create_incident AND assign_ticket=priority_queue AND suggest_response_text AND provide_premium_offer AND recommend_contact_type=in_channel_with_callback".

The system creates a ticket in the ACME Notes CRM system with the content of Lawrence's Tumblr blog post, and assigns it to the priority queue with Lawrence's information attached. In addition, the ticket contains Lawrence's feedback results from rating the Android Marketplace app (e.g. CSAT score), his Klout score (e.g. social web influencer rank), sentiment score (e.g. negative), linked social profiles, and a flag suggesting an offer of a discount to download the next release from ACME Notes be extended.

When the support agent Nancy, who monitors the customer care priority queue for ACME Notes, reads the ticket, she identifies that the system has indicated to respond directly in the comments section of Lawrence's Tumblr blog (generic text responses are suggested in the ticket), and to include links to live chat and click-to-call-back options in the response.

The result is that Nancy posts a response on Lawrence's Tumblr blog indicating that ACME Notes wants to make things right, and hopes Lawrence will contact Nancy directly via chat or click-to-call-back. Lawrence sees Nancy's comments on his blog, and selects the click-to-call-back option. Unfortunately, Nancy is off shift during Lawrence's requested call-back time, but his request is routed to another ACME Notes agent, Matthew, who is able to respond to Lawrence's request for a phone call, on time, and with the full case history at his fingertips. In addition, Matthew is prompted to offer Lawrence, a significant discount on the next release from ACME Notes. Lawrence thanks Matthew for the offer. Matthew closes the ticket.

The examples provided above are not intended to be an exhaustive explanation of each possible operation of the systems and methods described herein, and the various embodiments are not limited to any example described above.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A method comprising:
  receiving, by a computer system, a content item from a communication channel, wherein:
    the content item comprises:
      a communication from an individual; and
      a statement by the individual, the statement comprising committing language about an intent to attend an event;
  identifying the event as a topic of interest in the content item;
  determining, by the computer system, a commitment score of the individual to attend the event by:

calculating a strength value of the intent of the individual to attend the event by performing a natural language analysis of the committing language of the statement by the individual in the content item;

calculating a sentiment value of the intent of the individual to attend the event by performing a semantic analysis on the content item, the semantic analysis comprising identifying a description of a probability related to the event identified in the content item;

calculating a social impact value of the intent of the individual to attend the event by performing a social impact analysis of the content item based on a number of receiving subscribers to the content item on the communication channel; and calculating a magnitude value of the intent of the individual to attend the event by performing a magnitude of commitment analysis of the content item based on a cost of attending the event, wherein:

the commitment score comprises a combination of the strength value, the sentiment value, the social impact value, and the magnitude value; and determining, by the computer system, an action based on the commitment score of the individual to attend the event.

2. The method of claim 1, wherein the cost of attending the event is a personal cost.

3. The method of claim 1, wherein determining the commitment score further comprises weighting the strength value, the sentiment value, the social impact value, and the magnitude value.

4. The method of claim 1, wherein the natural language analysis includes identifying an indication of a date or location for the event in the content item.

5. The method of claim 1, wherein the natural language analysis includes identifying an indication of a purchase in the content item.

6. The method of claim 1, wherein performing the social impact analysis comprises performing network analysis to determine the number of receiving subscribers.

7. The method of claim 1, wherein the social impact analysis further comprises determining whether the communication channel is a personal or professional network.

8. The method of claim 1, wherein performing the semantic analysis further comprises identifying, by the computer system, conflicting language or conflicting sentiment in the content item.

9. The method of claim 1, wherein determining the action is further based on information about a location of the event obtained from a source other than the content item.

10. The method of claim 1, wherein determining the action includes one or more of sending a marketing communication to the individual providing the content item, adjust a set of sales parameters, update service information, pushing at least a portion of the content item to an alternate system, generating an automated response, issue a response in a same channel as a receiving channel for the content item, or selecting a different channel from the receiving channel for issuing a response.

11. The method of claim 1, wherein the event comprises a conference, seminar, a training class, a promotional event, a user group, a meeting with coworkers, a meeting, a movie, a meal, or a vacation.

12. A system comprising:
one or more processors;
a content monitor executable by the one or more processors and configured to:
receive a content item from one or more of a plurality of communication channels, and
determine the content item is to be processed further, the content item comprising:
a communication from an individual, and
a statement by the individual, the statement comprising committing language about an intent to attend an event;
an analysis engine executable by the one or more processors and configured to determine a commitment score of the individual to attend the event by:
identifying the event as a topic of interest in the content item;
calculating a strength value of the intent of the individual to attend the event by performing a natural language analysis of the committing language of the statement by the individual in the content item,
calculating a sentiment value of the intent of the individual to attend the event by performing a semantic analysis on the content item, the semantic analysis comprising identifying a description of a probability related to the event identified in the content item,
calculating a social impact value of the intent of the individual to attend the event by performing a social impact analysis of the content item based on a number of receiving subscribers to the content item on the communication channel, and
calculating a magnitude value of the intent of the individual to attend the event by performing a magnitude of commitment analysis of the content item based on a cost of attending the event, wherein:
the commitment score comprises a combination of the strength value, the sentiment value, the social impact value, and the magnitude value; and
determining an action based on the commitment score of the individual to attend the event.

13. The system of claim 12, wherein the cost of attending the event is a personal cost.

14. The system of claim 12, wherein determining the commitment score further comprises weighting the strength value, the sentiment value, the social impact value, and the magnitude value.

15. The system of claim 12, wherein the natural language analysis includes identifying an indication of a date or location for the event in the content item.

16. The system of claim 12, wherein the natural language analysis includes identifying an indication of a purchase in the content item.

17. The system of claim 12, wherein performing the social impact analysis comprises performing network analysis to determine the number of receiving subscribers.

18. The system of claim 12, wherein the social impact analysis further comprises determining whether the communication channel is a personal or professional network.

19. The system of claim 12, wherein performing the semantic analysis further comprises identifying conflicting language or conflicting sentiment in the content item.

20. The system of claim 12, wherein determining the action is further based on information about a location of the event obtained from a source other than the content item.

21. The system of claim 12, wherein the communication channel includes one or more of an electronic mail system, a social networking service, an audio channel, a Really Simple Syndication (RSS) feed, a Twitter feed, a web site, or an Application Program Interface to a second system.

22. The system of claim 12, wherein the event comprises a conference, seminar, a training class, a promotional event, a user group, a meeting with coworkers, a meeting, a movie, a meal, or a vacation.

23. A non-transitory machine-readable medium having computer-executable instructions stored thereon that when executed, causes one or more processors to perform operations comprising:
- receiving a content item from a communication channel, wherein:
  - the content item comprises:
    - a communication from an individual, and
    - a statement by the individual, the statement comprising committing language about an intent to attend an event;
- identifying the event as a topic of interest in the content item;
- determining a commitment score of the individual to attend the event by:
- calculating a strength value of the intent of the individual to attend the event by performing a natural language analysis of the committing language of the statement by the individual in the content item;
- calculating a sentiment value of the intent of the individual to attend the event by performing a semantic analysis on the content item, the semantic analysis comprising identifying a description of a probability related to the event identified in the content item;
- calculating a social impact value of the intent of the individual to attend the event by performing a social impact analysis of the content item based on a number of receiving subscribers to the content item on the communication channel; and
- calculating a magnitude value of the intent of the individual to attend the event by performing a magnitude of commitment analysis of the content item based on a cost of attending the event, wherein:
  - the commitment score comprises a combination of the strength value, the sentiment value, the social impact value, and the magnitude value; and
- determining an action based on the commitment score of the individual to attend the event.

24. The non-transitory machine-readable medium of claim 23, wherein the cost of attending the event is a personal cost.

25. The non-transitory machine-readable medium of claim 23, wherein determining the commitment score further comprises weighting the strength value, the sentiment value, the social impact value, and the magnitude value.

26. The non-transitory machine-readable medium of claim 23, wherein the natural language analysis includes at least one of identifying an indication of a date or location for the event in the content item or identifying an indication of a purchase in the content item.

27. The non-transitory machine-readable medium of claim 23, wherein determining the action includes one or more of sending a marketing communication to the individual providing the content item, adjust a set of sales parameters, update service information, pushing at least a portion of the content item to an alternate system, generating an automated response, issue a response in a same channel as a receiving channel for the content item, or selecting a different channel from the receiving channel for a issuing a response.

28. The non-transitory machine-readable medium of claim 23, wherein the event comprises a conference, seminar, a training class, a promotional event, a user group, a meeting with coworkers, a meeting, a movie, a meal, or a vacation.

* * * * *

UNITED STATES PATENT AND TRADEMARK OFFICE
CERTIFICATE OF CORRECTION

| | |
|---|---|
| PATENT NO. | : 9,547,832 B2 |
| APPLICATION NO. | : 13/347297 |
| DATED | : January 17, 2017 |
| INVENTOR(S) | : Merlyn Gordon |

It is certified that error appears in the above-identified patent and that said Letters Patent is hereby corrected as shown below:

On the Title Page

In the Assignee item (73), please replace "ORACLE INTERNATIONAL CORPORATION, Redwood Shores, CA (US)" with -- ORACLE OTC SUBSIDIARY LLC, Redwood Shores, CA (US) --

Signed and Sealed this
Seventeenth Day of April, 2018

Andrei Iancu
*Director of the United States Patent and Trademark Office*